(12) United States Patent
Nitsch et al.

(10) Patent No.: US 9,573,711 B2
(45) Date of Patent: *Feb. 21, 2017

(54) DEVICE FOR FORMING PACKAGING UNITS

(71) Applicant: KHS GmbH, Dortmund (DE)

(72) Inventors: Thomas Nitsch, Kleve (DE); Christopher Stuhlmann, Korbach (DE); Ernst Van Wickeren, Weeze (DE); Stefan Wagner, Xanten (DE); Volker Zahn, Volkmarsen (DE)

(73) Assignee: KHS GmbH, Dortmund (DE)

( * ) Notice: Subject to any disclaimer, the term of this patent is extended or adjusted under 35 U.S.C. 154(b) by 76 days.

This patent is subject to a terminal disclaimer.

(21) Appl. No.: 14/362,281

(22) PCT Filed: Nov. 30, 2012

(86) PCT No.: PCT/EP2012/004966
§ 371 (c)(1),
(2) Date: Jun. 2, 2014

(87) PCT Pub. No.: WO2013/079220
PCT Pub. Date: Jun. 6, 2013

(65) Prior Publication Data
US 2015/0191263 A1 Jul. 9, 2015

(30) Foreign Application Priority Data

Dec. 2, 2011 (DE) .......................... 10 2011 119 970
Feb. 1, 2012 (DE) .......................... 10 2012 100 810

(51) Int. Cl.
*B32B 37/00* (2006.01)
*B65C 11/00* (2006.01)
(Continued)

(52) U.S. Cl.
CPC ............... *B65B 17/02* (2013.01); *B65B 21/06* (2013.01); *B65B 35/46* (2013.01); *B65B 35/58* (2013.01);
(Continued)

(58) Field of Classification Search
CPC .......... B65B 17/02; B65B 2/06; B65B 35/462; B65B 35/46; B65B 35/58; B65B 29/00; B65B 51/02; B65B 51/06; Y10T 156/1744; B65G 2201/0244; B65G 29/00; B65G 47/088; B65G 47/846
See application file for complete search history.

(56) References Cited

U.S. PATENT DOCUMENTS 2,495,174 A 1/1950 McClathchie
4,078,357 A * 3/1978 Ida .......................... B65B 17/02
156/561
(Continued)

FOREIGN PATENT DOCUMENTS

CN 1576171 2/2005
CN 101905764 12/2010
(Continued)

OTHER PUBLICATIONS

English translation of claims and description of CN101905764.*
(Continued)

*Primary Examiner* — Alex Efta
(74) *Attorney, Agent, or Firm* — Occhiuti & Rohlicek LLP (57) ABSTRACT

An apparatus for producing container bundles without a shrink film or strapping has container guides, which are either base or head guides, a grouping unit, one or more application elements, a multiple track container feed providing multiple container streams, and a container transporter for each stream. The guides are disposed on the container transporter. An application element near the transporter applies adhesive to containers. The grouping unit groups and compress a predetermined number of containers to form a container bundle.

20 Claims, 9 Drawing Sheets

(51) Int. Cl.
- *B65C 9/46* (2006.01)
- *B65B 17/02* (2006.01)
- *B65B 51/02* (2006.01)
- *B65B 35/46* (2006.01)
- *B65B 35/58* (2006.01)
- *B65G 47/08* (2006.01)
- *B65B 21/06* (2006.01)
- *B65G 29/00* (2006.01)
- *B65G 47/84* (2006.01)
- *B65B 51/06* (2006.01)

(52) U.S. Cl.
CPC ............... *B65B 51/02* (2013.01); *B65G 29/00* (2013.01); *B65G 47/088* (2013.01); *B65G 47/846* (2013.01); *B65B 51/06* (2013.01); *B65G 2201/0244* (2013.01); *Y10T 156/1744* (2015.01)

(56) References Cited

U.S. PATENT DOCUMENTS

| | | | |
|---|---|---|---|
| 7,726,464 | B2 | 6/2010 | Cerf |
| 2010/0308043 | A1 | 12/2010 | Wimmer |
| 2011/0016831 | A1 | 1/2011 | Huber et al. |
| 2014/0352868 | A1* | 12/2014 | Ehmer .................... B65B 17/02 156/60 |

FOREIGN PATENT DOCUMENTS

| | | | |
|---|---|---|---|
| DE | 4126212 | 2/1993 | |
| DE | 102006037105 | 2/2008 | |
| DE | 102008038146 | 2/2010 | |
| DE | 102009025824 | 11/2010 | |
| DE | 102009044271 | 4/2011 | |
| EP | 1495973 | 1/2005 | |
| EP | 1495973 A1 * | 1/2005 | ............ B65B 21/04 |
| EP | 1647518 | 4/2006 | |
| EP | 2096039 | 9/2009 | |
| EP | 2258625 | 12/2010 | |
| JP | 11-59639 | 3/1999 | |
| JP | 2001-213408 | 8/2001 | |
| JP | 2008-162699 | 7/2008 | |
| WO | WO00/68087 | 11/2000 | |

OTHER PUBLICATIONS

English translation of claims and description of EP1647518.*
English translation of claims and description of DE102008038146.*
English translation of claims and description of DE102006037105.*
English translation of claims and description of DE102009044271.*
English translation of claims and description of DE10200925824.*
English translation of claims and description of EP2258625.*
English translation of claims and description of DE4126212.*

* cited by examiner

DEVICE FOR FORMING PACKAGING UNITS

RELATED APPLICATIONS

This application is the national stage entry, under 35 USC 371, of PCT application PCT/EP2012/004966, filed on Nov. 30, 2012, which claims the benefit of the Dec. 2, 2011 priority date of DE 10 2011 119 970.9, and Feb. 1, 2012 of German application DE 10 2012 100 810.8 the contents of which are herein incorporated by reference.

FIELD OF INVENTION

The invention relates container processing, and in particular, to forming bundles of containers.

BACKGROUND

The combining or forming of a plurality of articles into a group of articles and from the groups of articles to produce firm and/or transportable storage and transport units or bundles using shrink films, as described in U.S. Pat. No. 7,726,464 is known. One of the disadvantages of this is that the films used, and in particular the shrinking-on of the films by the application of heat or energy, is expensive.

It has also already been proposed to produce transportable bundles by strapping containers together, as described in DE 102009025824, DE 102009044271, and DE 4126212. This is a particularly inexpensive and simple way of producing bundles or transport and storage units. The strapping can also be bonded with the containers.

One disadvantage of strapping, however is that when one container is first removed from such a bundle, the containers remaining in the bundle are no longer held together by the strapping. This is the case not only when the strapping is removed or cut, but also when one takes a container from the bundle without severing the strapping.

Moreover transporting such bundles on a belt conveyor presents the danger that cylindrical or chiefly cylindrical articles, such as cans, bottles or containers, assume a nesting position, i.e. slip into a gap in the adjacent row, due to vibration, impacts etc. With known bundles, a very high tension must be applied to the strapping in order to avoid this.

DE 102006037105 discloses to a method for combining bottle packets in which a rotary star wheel that presses bottle necks into clips on flat carriers is provided on both sides of a track. The bottle packet is also wrapped with a tape or an envelope, or film).

According to DE 2331193, an adhesive is applied to containers in narrow surfaces or rows, with contiguous surfaces that are not provided with adhesive being intended to facilitate a gripping of the packing for carrying purposes. The containers stick to one another at the adhesive points.

EP 2096039 also relates to containers being provided with an adhesive, with a shrink film also being disposed around the bottle packet however. DE 102008038146 discloses a shaft drive system that has a coaxial direct drive containing the motor and in which the motor's rotor is mounted directly on the shaft and the stator, the shaft and the rotor are externally fixed and enveloped. EP 1647518 discloses a sealing machine that has a fixed-position central pillar that is free from elements for mechanical force transmission and so only contains lines.

SUMMARY

The object of the invention is to provide a device and a method for producing bundles of containers in a way that avoids both enveloping film and strapping, with the articles being prevented, in a simple manner, from adopting a nesting position while being transported, even after one or more articles have been removed from the bundle.

A suitable apparatus receives containers via a single or multiple track container feed or single or multiple track container streams and has at least one primary star rotating about a central axis and belonging to a star transporter having at least one application element in the region of the star transporter by way of which at least one adhesive agent and/or at least one adhesive agent application can be applied on or to containers.

This object is thus achieved by a device for producing bundles that has a star transporter provided for each of the container streams, with the respective primary star of the respective star transporter having a plurality of base guides and/or head guides for containers, and with there being provided, immediately after the primary star or an outlet device, a partitioning and/or compressing unit or a partitioning or compressing section for the grouping and compressing as well as temporary pressing together of a predetermined number of containers, by way of which the containers are combined to form a bundle downstream of the star transporter and transported onward. It is advantageous if the respective primary star of the respective star transporter has both a plurality of base guides and a plurality of head guides for the containers.

As used herein, "container" includes bottles, cans, tubes, pouches, being made from metal, glass and/or plastic, including also PET bottles, and other packaging elements, in particular those that are suitable for filling with liquid or viscous products, as well as containers already combined into groups.

Such containers, e.g. PET bottles, have a spherically-arched contact region that enables the containers to roll off against one another around a peripheral path, i.e. at a roll-off ring. This can be seen in glass bottles that have been used many times as a wear ring. In the case of PET bottles such "roll-off rings" can be arranged not only in the head region but in the foot region also.

As used herein, "adhesive agents" include materials or masses that facilitate an adhesive bond between containers, in particular compounds, materials or masses that, when applied in the liquid or semi-liquid state, form a self-adhesive coat and/or bring about an adhesive bond under the application of pressure and/or energy and/or after curing or cross-linking, including through application of energy.

"Bonding agents or adhesives" in the sense of the invention include, for example, multilayer materials, e.g. those comprising at least one carrier material that is coated with a material with which an adhesive bond between containers is possible, are that are therefore adhesive or otherwise ready for bonding on at least two sides. Such adhesive agents can also be referred to as pads.

An "adhesive" container has, in the sense of the invention, bonding agent or adhesive, or is provided with an application of bonding agent and adhesive. The bonding agent or adhesive is preferably selected such that the containers can be detached from the bundle and/or separated from one another by hand and without damage.

The application elements can apply liquid adhesive agent, for example a low-viscosity UV-curing adhesive. They can also apply a hot-melt adhesive. But a hot-melt adhesive cools rapidly and could possibly lose its adhesive properties before the containers of the bundle are sufficiently bonded to one another. A UV-curing adhesive is also beneficial due to the particularly easy setting of its desired properties.

A corresponding curing station or curing section is expediently provided downstream of the application elements, either statically or along the linear transporter above or, if necessary, also below. A curing station can be a tunnel with UV-lighting, for example. The curing station is preferably positioned downstream of the star transporter, disposed preferably on the linear transporter.

It is useful if the star transporter has the primary star, an inlet device and the outlet device. The inlet device can be implemented as an inlet star, with the outlet device being implemented as an outlet star. The inlet device adapts the incoming container stream to the pitch of the main star such that the respective containers can be transferred to the main star without a problem. The containers can be transported onward at predetermined intervals with the outlet device.

It is expedient if the base guides are configured as turntables, with the head guides either having, at their respective holding ends, packing or centering tulips, or being configured as tulips. In this way, the respective container, when clamped between the turntable and the packing or centering tulip, is held securely in position. A rotation of the individual container additional to the rotation about the axis of the primary star can be effected with the turntable and the head guide. This is favorable in order to turn the container on its transport path about the axis of rotation of the primary star relative to the latter such that, in the peripheral direction of the container, a plurality of contact and touching surfaces of the container can be provided with adhesive agent. It is also expedient if a plurality of application elements follow one another when seen in the direction of rotation of the primary star. By way of the turntable, it is also possible for the standing containers to be aligned on certain container and/or furnishing features, e.g. on so-called embossings, and to then provide adhesive agent such that the containers of a bundle are aligned exactly identically with one another in the bundle.

In a preferred embodiment, two application elements are arranged one above the other, with the subsequent application elements being likewise arranged one above the other. Each application element can thus always apply adhesive to precisely one container region, i.e. one section of the contact and touching surface. The application elements can naturally be actuatable, i.e. adjustable in their inclination relative to each spatial axis, for example in the event of a spraying or sprinkling application of contact adhesive and adhesive. The application elements can also be entrained with a container over at least a partial distance, although this is not absolutely necessary.

The star transporter, preferably the primary star or the outlet device, is immediately followed by a linear transporter that functions, for example, as a partitioning or compressing section that combines containers to form bundles and transports them onwards, with static and/or moving guide elements possibly being provided along either side of the linear transporter, and with entraining elements possibly being provided, each being associated with a bundle.

The guide elements, or guide rails, guide and support the bundles or the containers of the bundle between them. In some embodiments, the guide elements are rigidly implemented. It is, however, also possible for the guide elements to be configured as travelling elements such that the containers or bundles do not have a speed relative to the laterally disposed guide elements. The laterally disposed guide elements can apply lateral pressure to promote adhesive bonding of the containers of the bundle. In other words, the guide elements not only have the function of guiding and supporting but also the function of generating a pressure that acts on the containers. The pressure, when looked at square to the transport direction, compresses the containers of the bundle and draws them nearer to one another, pressing them against one another so as to promote an adequate adhesive bond.

In a preferred embodiment, the entraining elements are arranged square to the transport direction and extend fully across the linear transporter. When seen in the transport direction, the entraining elements are disposed behind the bundle such that they push the bundle along before them. As a result of this, a force is beneficially generated. This force compresses the containers when seen in or against the transport direction and thus promotes their interconnection.

In order to improve the bond between the containers of the bundle when seen not only square to the transport direction but in the transport direction as well, the entraining elements can impart, to the containers or to the bundle, a speed acting relative to the linear transporter when seen in the transport direction. A conveying speed of the entraining element or elements that is greater than the conveying speed of the linear transporter tends to push or slide the containers or the bundle from the inlet side towards the outlet side. This pushing force can increase the adhesive bond considerably. In a preferred embodiment the entraining elements can be configured as an entraining bar. The entraining elements may also themselves be driven and/or be connected to the guide elements.

In addition to carrying out the foregoing functions, the guide elements could also assume the guiding function for the entraining elements. For driven, and hence circulating guide elements, it is advantageous to rigidly attach the entraining elements to the guide elements. In that case, the above mentioned relative speed could be generated by the guide element drive.

The guide elements could also be adjustable in the transverse direction. This enables the device to be adjustable for different container dimensions. A central control unit of the overall installation individually adjusts the conveying speed of the linear transporter, the guide elements, and/or the entraining elements.

It is also possible also to provide the bundle with a carrying element, for example a handle. To achieve this, suitable devices may be arranged downstream of the outlet side or at a suitable position on the linear transporter. The carrying element can be attached to the bundle with the aforementioned adhesive agent.

The invention therefore provides a device for producing a bundle that, despite the lack of an enveloping film and/or despite the lack of strapping, is nevertheless able to prevent the containers from adopting a nesting position while being transported, and to do so in a simple manner. Even removal of one or more containers from a bundle fails to impair the cohesion of the remaining containers in the bundle. Dispensing with a film or strapping, thus creating a filmless and strapless bottle pack, eases the burden on the environment by avoiding waste, and also saving resources used to produce the films or strappings, which are usually produced from plastic. The containers of a bundle are aligned and stuck directly to one another during transport, i.e. in the continuous operation of the packing machine. A filmless bottle pack can also be achieved with a minimum amount of adhesive that is necessary for adequately bonding the individual containers to one another.

The containers can be aligned, for example, according to design features. The alignment function can be delegated to a separate alignment star arranged upstream of the primary star. The container streams can be fed to the alignment star via an inlet star, with the inlet star corresponding to that aforementioned. Between the alignment star and the primary star there is preferably disposed a transfer star that, in a preferred embodiment, may exhibit the dimensions of the inlet star and/or of the aforementioned outlet star.

Detection systems, for example camera systems, are arranged on the alignment star. These detection systems detect the actual positions of, for example labels, embossings, and/or other features. The actual data is fed to an evaluator that compares it with stored nominal data. This is used to enable the head or base guides, for example the packing tulips or turntables, to move each container to its desired nominal position. Such an alignment is known, for example, from labeling machines in which e.g. bottles are aligned in such a way that labels can be applied to the bottles with identical orientation.

Suitable alignment can expediently be achieved with the alignment star, which ensures that the containers with labels and/or other design features are received in the future bundle with identical orientations. The alignment star moves the container into their respective nominal positions. The primary star then handles each container in its nominal position, as described above. The container remains aligned in its nominal position along its transport path.

The packing machine also handles containers with different dimensions and/or formats. If a format change is due, the operating parameters and operating components are adapted to the new container format. Inlet, transfer, or outlet stars could, for example, be exchanged. To easily permit a format change, the alignment star and/or the primary star are configured with adjustable main axes. As a result, despite the format change, the alignment star and/or the primary star can remain with their respective components in the handling installation. The main axes of the primary star and/or the alignment star are preferably adjustable to suit the new container format, both parallel to the transport direction and transversely thereto. The head and/or base guides are preferably configured to be universally usable.

It is also beneficial to configure the star transporter or its components, preferably the primary star and/or the alignment star, with a vertical column in which a drive element is integrated. The drive element is configured, preferably, as an actuatable electric motor. The vertical column can be displaceable along the adjustment axes so as to be adjustable to a format change. Instead of a linear feed, the containers can also be fed by way of one transport star per container stream.

In one aspect, the invention features an apparatus for producing bundles. The apparatus has at least one application element, container guides, a grouping unit, a multiple track container feed providing multiple container streams, and a container transporter for each container stream. The container guides, which are disposed on the transporter, are either base guides, head guides, or a mixture of both. The at least one application element is disposed in a region of the container transporter and applies adhesive to containers. The grouping unit includes either a partitioning unit, a compressing unit, a partitioning section, a compressing section, or some combination thereof. The grouping unit groups and compresses a predetermined number of containers. It is disposed immediately downstream from either the container transporter or an outlet device. The grouping unit is configured to combine the predetermined number of containers to form a bundle of containers downstream of the transporter for transportation onward.

In some embodiments, the container transporter comprises both base guides and head guides. Among these are embodiments in which the bottom guides comprise turntables, and the top guides comprise packing-and-centering tulips.

In other embodiments, the grouping unit comprises a linear transporter on which the containers are combined to form bundles and on which the bundles are transported onwards. The linear transporter is arranged downstream of the container transporter.

In yet other embodiments, the application elements are disposed one after another in a direction of conveyance of the container transporter.

Also among the embodiments are those in which at least two application elements are arranged one above the other.

In some embodiments, the container transporter for each container stream comprises a star transporter for each container stream. Each star transporter comprises a primary star. The container guides are disposed on the primary star. The star transporter comprises a central axis about which the primary star rotates. The at least one application element is disposed in a region of the star transporter.

Among the foregoing embodiments are those in which the primary star comprises both base guides and head guides, those in which the application elements are disposed one after another in a direction of rotation of the primary star, and those in which each star transporter further comprises an alignment star disposed upstream of the primary star.

In other embodiments, the container transporter for each container stream comprises an electromagnetic linear drive with electrically-driven carriages. The electrically-driven carriages can be driven independently of one another at different speeds. For example, one carriage may be driven at a first speed and the other may be driven at a second speed that is sometimes greater than the first speed.

In other embodiments, there is also an alignment unit disposed upstream of the container transporter. Among these embodiments are those in which the alignment unit comprises an electromagnetic linear drive having electrically-driven carriages that can be driven independently of one another and whose speed can be independently controlled.

Also within the scope of the invention are alternative embodiments in which there is an alignment unit disposed upstream of the container transporter, and the alignment unit comprises an electromagnetic linear drive with electrically-driven carriages that can be driven independently of one another and whose speed can be independently controlled.

Among the embodiments are those in which the electrically-driven carriages comprise container grippers. These include embodiments having motorized drives configured to rotate containers gripped by the container grippers of the electrically-driven carriages.

In another aspect, the invention features an apparatus for producing container bundles without a shrink film or strapping has container guides, which are either base or head guides, a grouping unit, one or more application elements, a multiple track container feed providing multiple container streams, and a container transporter for each stream. The guides are disposed on the container transporter. An application element near the transporter applies adhesive to containers. The grouping unit groups and compress a predetermined number of containers to form a container bundle.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of an embodiment example with reference to the figures. In the figures.

In the different figures, the same reference character in each case identifies identical parts, which is why they are generally described only once.

DETAILED DESCRIPTION

Figure 1:
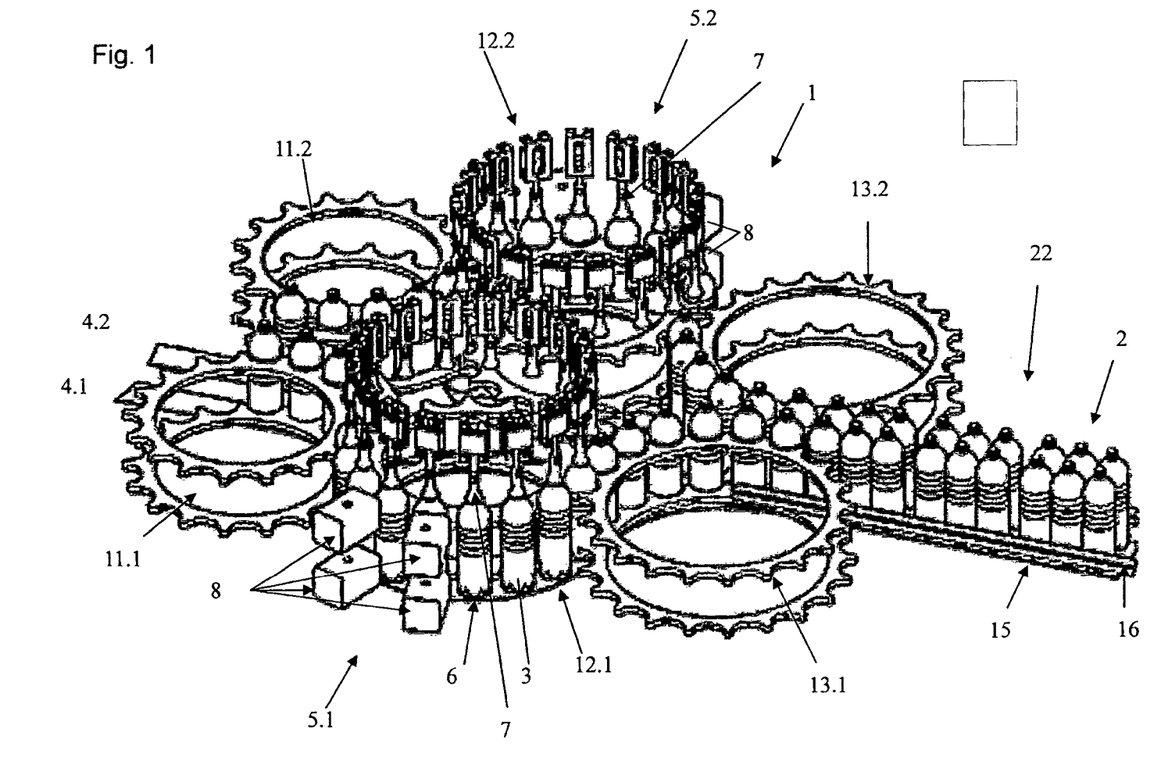
FIG. 1 shows, in perspective view, a partial section of a device for producing a bundle having six articles or containers.

FIG. 1 shows a partial section of a packaging machine 1 for producing bundles 2 from containers 3. The packaging machine 1 receives a wide container stream of container 3 and converts it into a plurality of, as depicted for example into two, single-track container streams 4.1, 4.2. The containers 3 have container features and/or furnishing features that are oriented in arbitrary directions.

One star transporter 5, 5.1, 5.2 is provided for each of the container streams 4.1, 4.2. Each star transporter 5 has a plurality of base guides 6 and head guides 7 for containers 3. Application elements 8 are disposed on the star transporter or on its primary star 12, 12.1, 12.2. Containers 3 are combined downstream of the star transporter 5 to form a bundle 2.

Containers 3 are transported from an inlet side 9 towards an outlet side 10 in an axial transport direction 14. Application elements 8 are provided at the star transporter 5 for the applying an adhesive agent. The containers 3 are combined to form a complete bundle 2 downstream of the star transporter 5 and transported towards the outlet side 10.

FIG. 1 shows that each star transporter 5, 5.1, 5.2 has an inlet device 11, 11.1, 11.2, a primary star 12, 12.1, 12.2, and an outlet device 13, 13.1, 13.2 for respective container tracks 4.1, 4.2. The inlet device 11 is implemented as an inlet star and the outlet device 13 is implemented as an outlet star. Because a star transporter 5 is provided for each container track 4.1, 4.2, they or their components are provided in the figures with the auxiliary number ".1" or ".2" to indicate the association with respective container track 4.1, 4.2. The respective components are identical in each case.

Base guides 6 on the primary star 12 are configured, for example, as turntables, with their head guides 7, at the holding end, either having or being configured as packing or centering tulips. A container 3 is thus held securely in a stable position between a base guide 6 and a head guide 7. Turntables and packing or centering tulips are known, for example, from their use in labeling machines.

Figure 2:
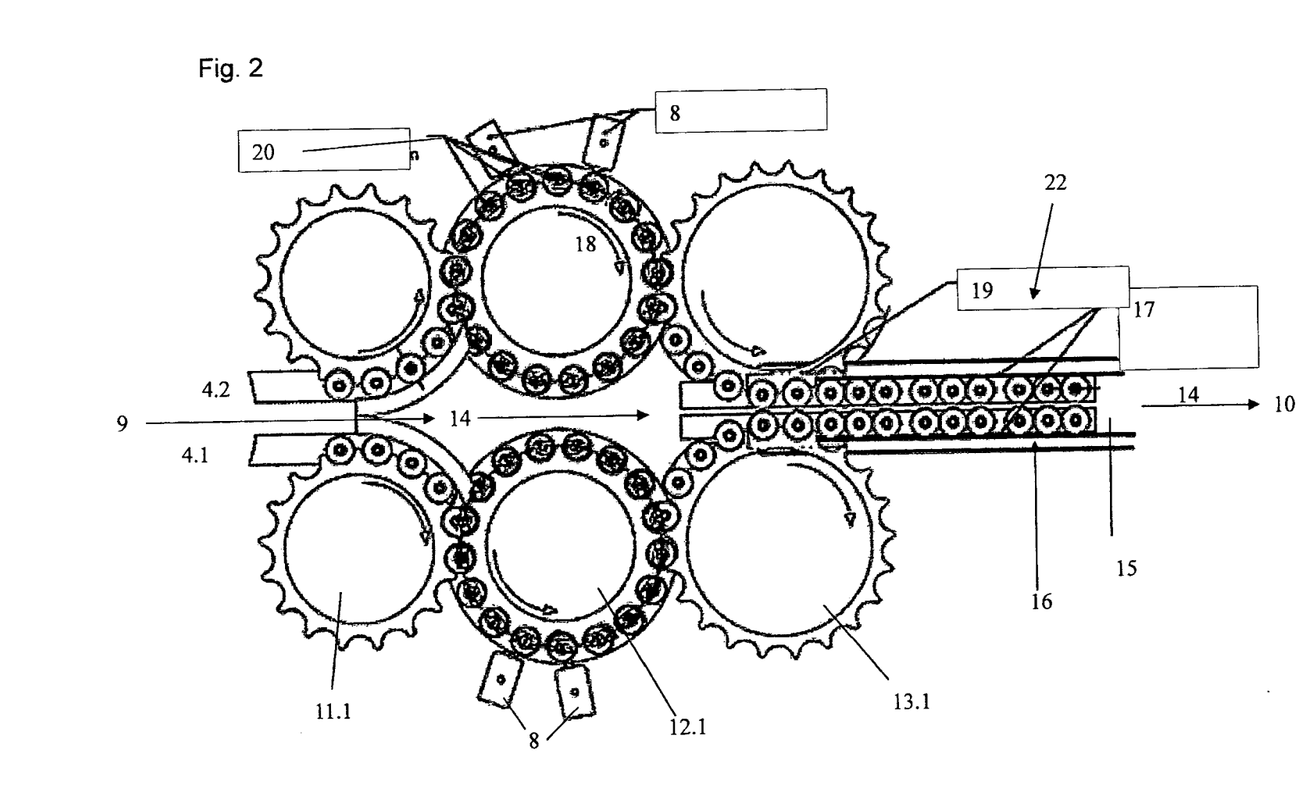
FIG. 2 shows, in plan view, the partial section of FIG. 1
Figure 3:
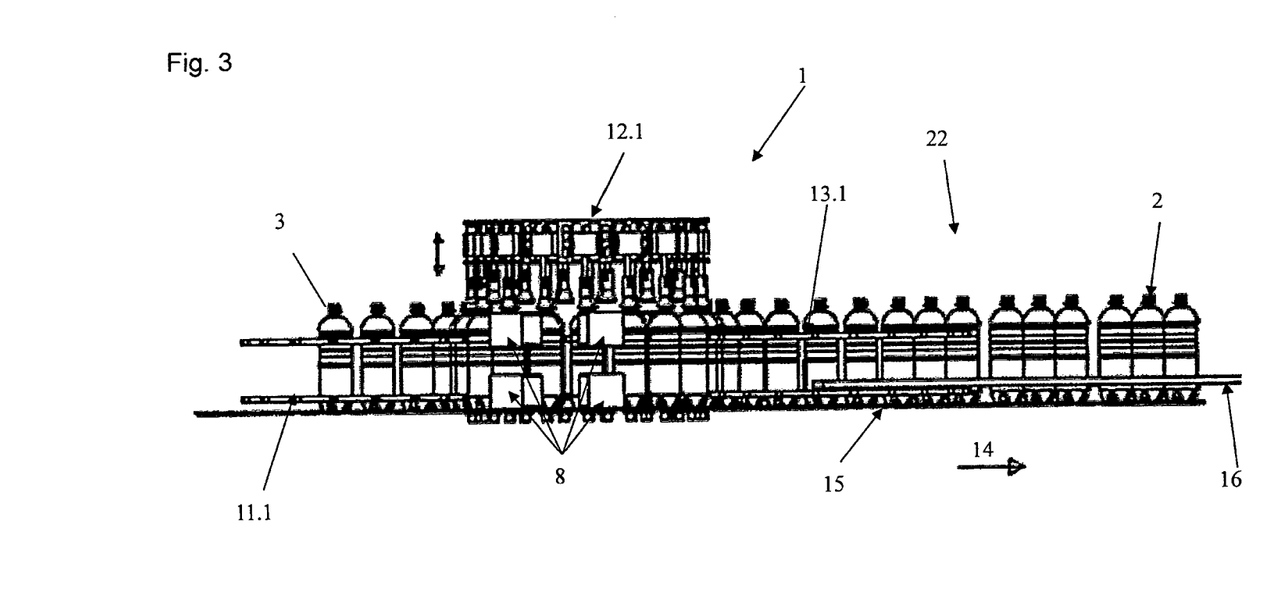
FIG. 3 shows, in side view, the partial section of FIG. 1.

As can be seen from FIGS. 1 and 2, a plurality of application elements 8 is provided on the primary star 12. These application elements follow one another when seen in the direction of rotation, indicated by an arrow 18, of the main star 12. The base guide 6 makes it possible to align standing containers so that certain container and/or furnishing features, such as embossings, are oriented in a predictable manner, so that after having an adhesive agent applied to them, the containers 3 are aligned exactly relative to each other once they are accommodated in the bundle 2. The container 3 can also be rotated simply to apply adhesive agent at a plurality of contact and touching surfaces when seen in peripheral direction. An aligning or rotating, which takes place either upstream of application elements 8 and/or between application elements 8 following in the direction of rotation 19 is indicated by reference character 20 in FIG. 2.

In a preferred embodiment, two application elements 8 to are arranged one above the other, with subsequent application elements 8 being likewise arranged one above the other. Each application element 8 thus always provides precisely one container region, i.e. one section of the contact and touching surface, with contact adhesive and adhesive. The application elements 8 can be adjusted in their inclination relative to each spatial axis, for example in the event of a spraying or sprinkling application of contact adhesive and adhesive. Application elements 8 can also be entrained with a container 3 over at least a partial distance.

A linear transporter 15 that functions as a partitioning and/or compressing section 22 is arranged immediately downstream of an outlet device 13 or of both outlet starwheels 13.1 and 13.2. The outlet device 13 or the two outlet stars 13.1 and 13.2 bring adhering containers 3 together and transfer adhering containers 3 in pairs to the linear transporter 15, as depicted in FIG. 2 by reference character 19. In the process, two adhering containers 3 are first pressed together at their contact and touching surfaces.

Figure 4:
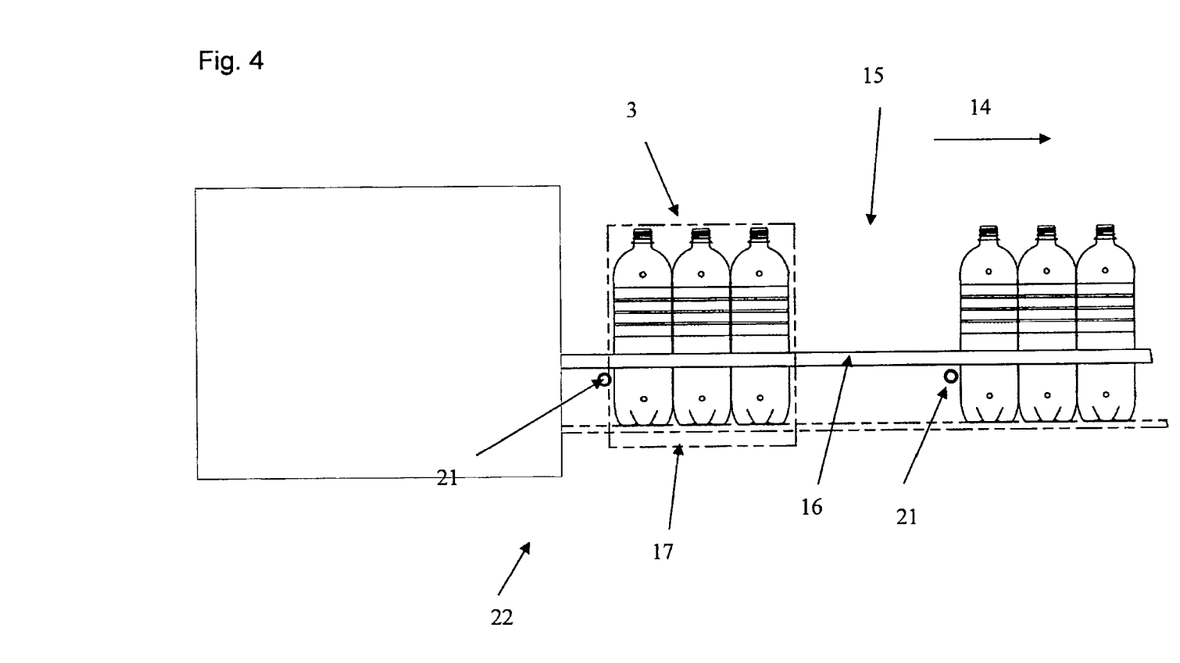
FIG. 4 shows an exemplary embodiment of a partitioning or compressing section in the exemplary embodiment as a linear transporter.

The linear transporter 15 can be configured to combine of a plurality of container pairs, for example three, to form a bundle 2 that has six containers 3. For this purpose, a linear transporter 15 may have entraining elements 21, and in addition lateral guide elements 16 as depicted in FIG. 4.

The linear transporter 15 is therefore downstream of the star transporter 5 or the outlet device 13. The static and/or moving guide elements 16 can be provided on either side of the linear transporter 15. Entraining elements 21 may also be provided, each of which is associated with one bundle 2. The entraining elements 21 can apply a force along the axial transport direction 14 to press together the containers 3 of a bundle 2. The guide elements 16 can apply a pressing force on the containers 3 square to transport direction 14 to also promote an adhesive bond in the transverse direction.

Where UV-curing adhesive is used, a curing station 17, such as a UV curing station is beneficially positioned on linear transporter 15.

Alignment of containers 3 into a nominal position is carried out along the transport path of the primary star 12.1, 12.2. In the embodiment depicted in FIGS. 5 to 7, the alignment is performed on an alignment star 23.1, 23.2 that is upstream of the respective primary star 12.1, 12.2. An inlet star 11.1, 11.2 feeds containers 3 in the container streams 4.1, 4.2 to the alignment star 23.1, 23.2.

Figure 5:
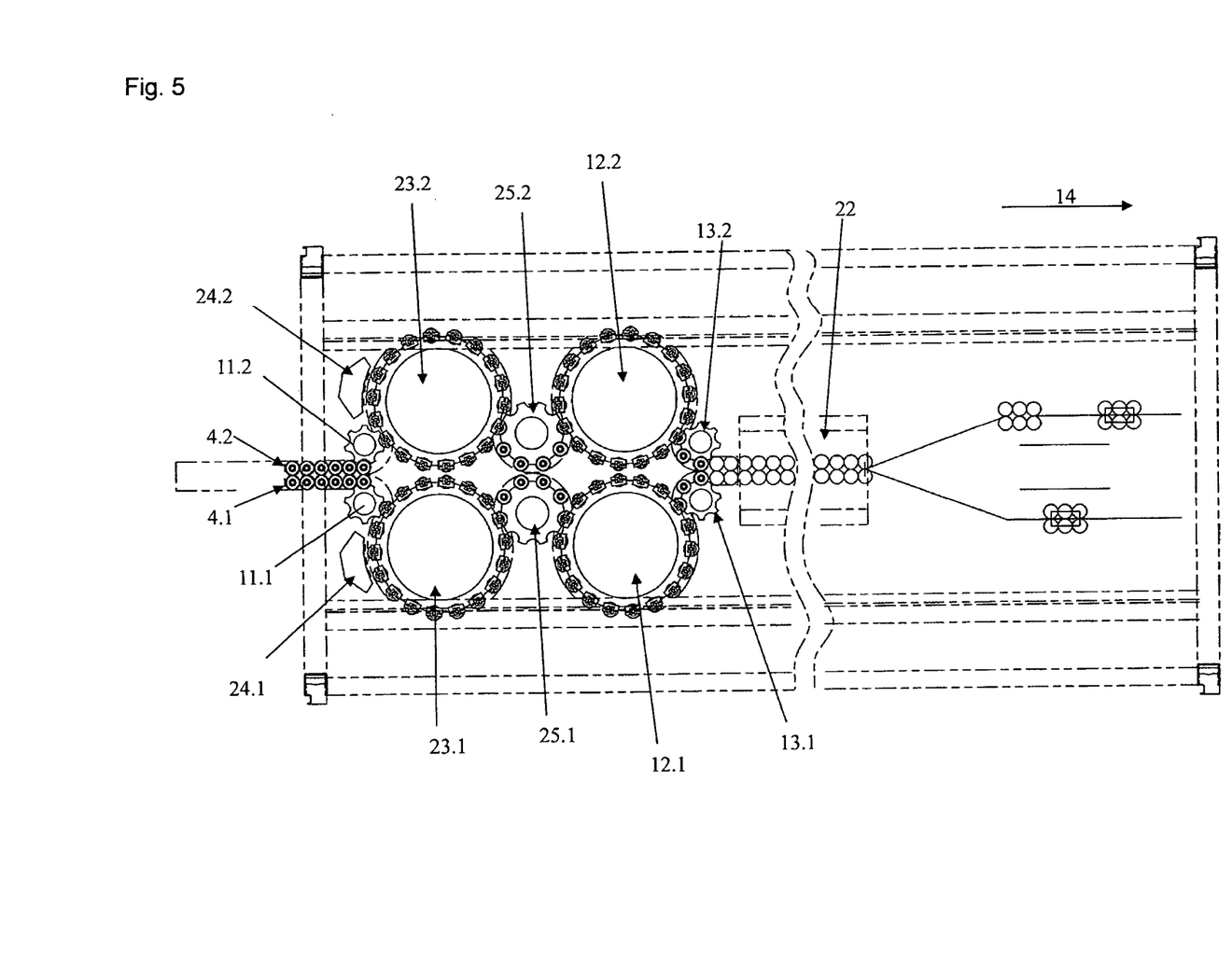
FIG. 5 shows the partial section of FIG. 1 in plan view with an upstream alignment star and contiguous partitioning or compressing section
Figure 6:
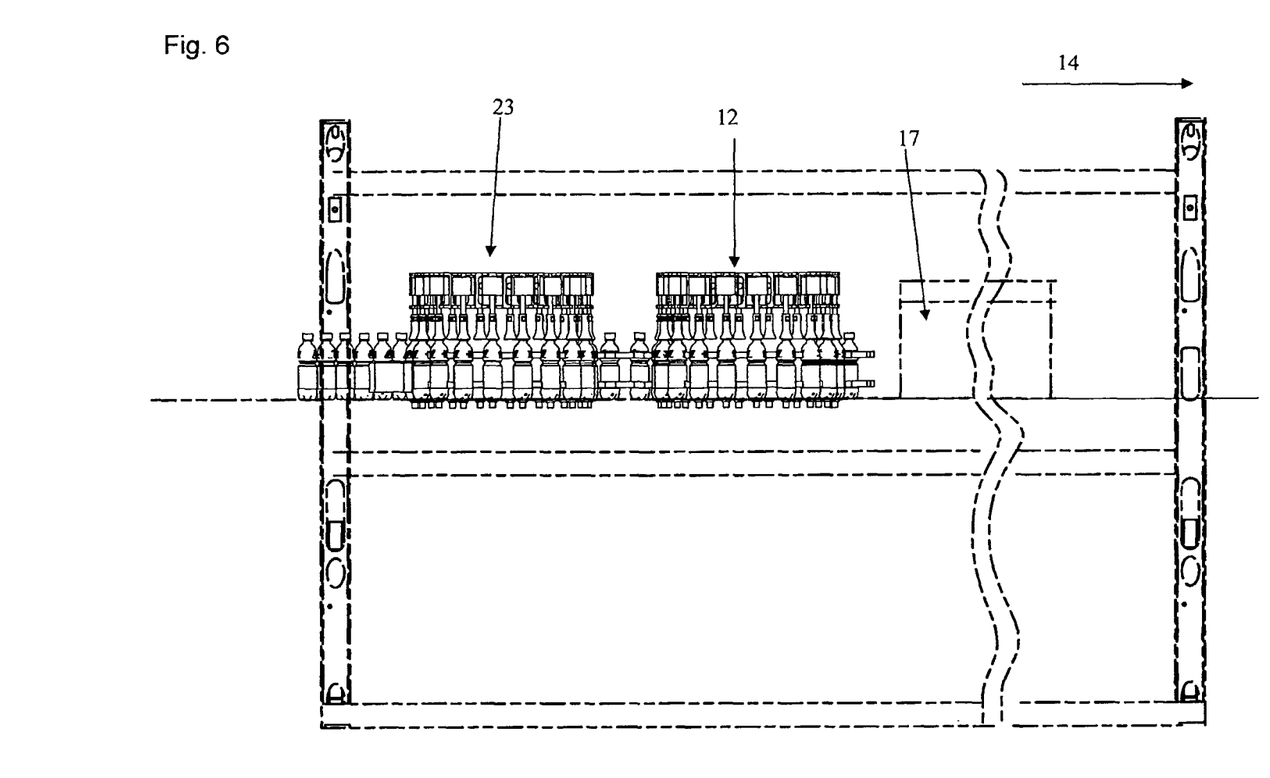
FIG. 6 shows the partial section of FIG. 5 in a side view.
Figure 7:
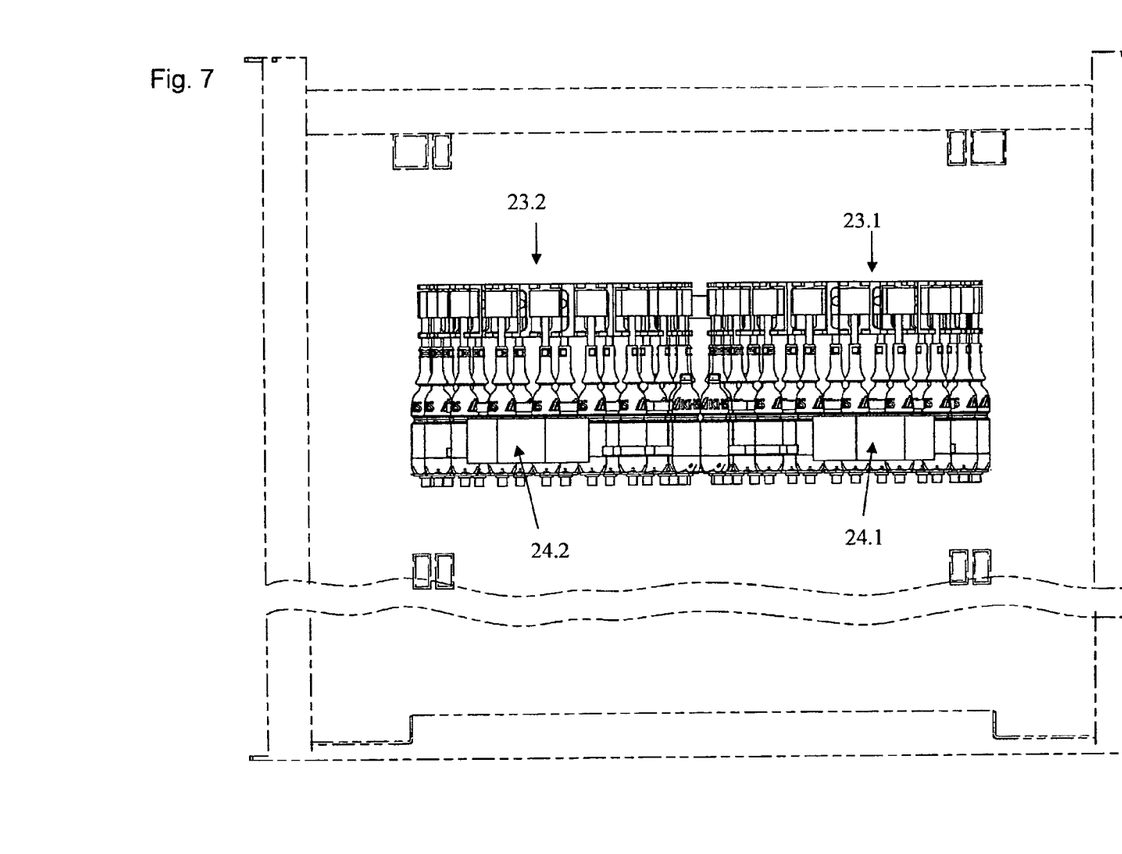
FIG. 7 shows the partial section of FIG. 5 in a front view from the inlet side.

A detection system 24.1, 24.2 is disposed on the alignment star 23.1, 23.2. In the exemplary embodiment, the detection system 24.1, 24.2 is a camera system.

A transfer star 25.1, 25.2 is disposed between a respective alignment star 23.1 or 23.2 and a respective primary star 12.1, 12.2. In the preferred embodiment, the transfer star 25.1, 25.2 has the dimensions of the inlet star 11.1, 11.2 and/or of the outlet star 13.1, 13.2.

The exemplary detection systems 24.1, 24.2 detect the actual position of, for example, labels, embossings, and/or other features. The actual data is fed to an evaluator that compares the detected data with stored nominal data. Based on the comparison, the head guides 7 or the base guides 6, for example packing tulips or turntables, move the container 3 concerned to the desired nominal position. A container 3 aligned into the nominal position remains in that position along the rest of its transport path. In the further course of partitioning and/or compressing section 22 the bundle stream is divided up into, for example, two parallel bundle streams as shown, by way of example, in FIG. 5.

Figure 8:
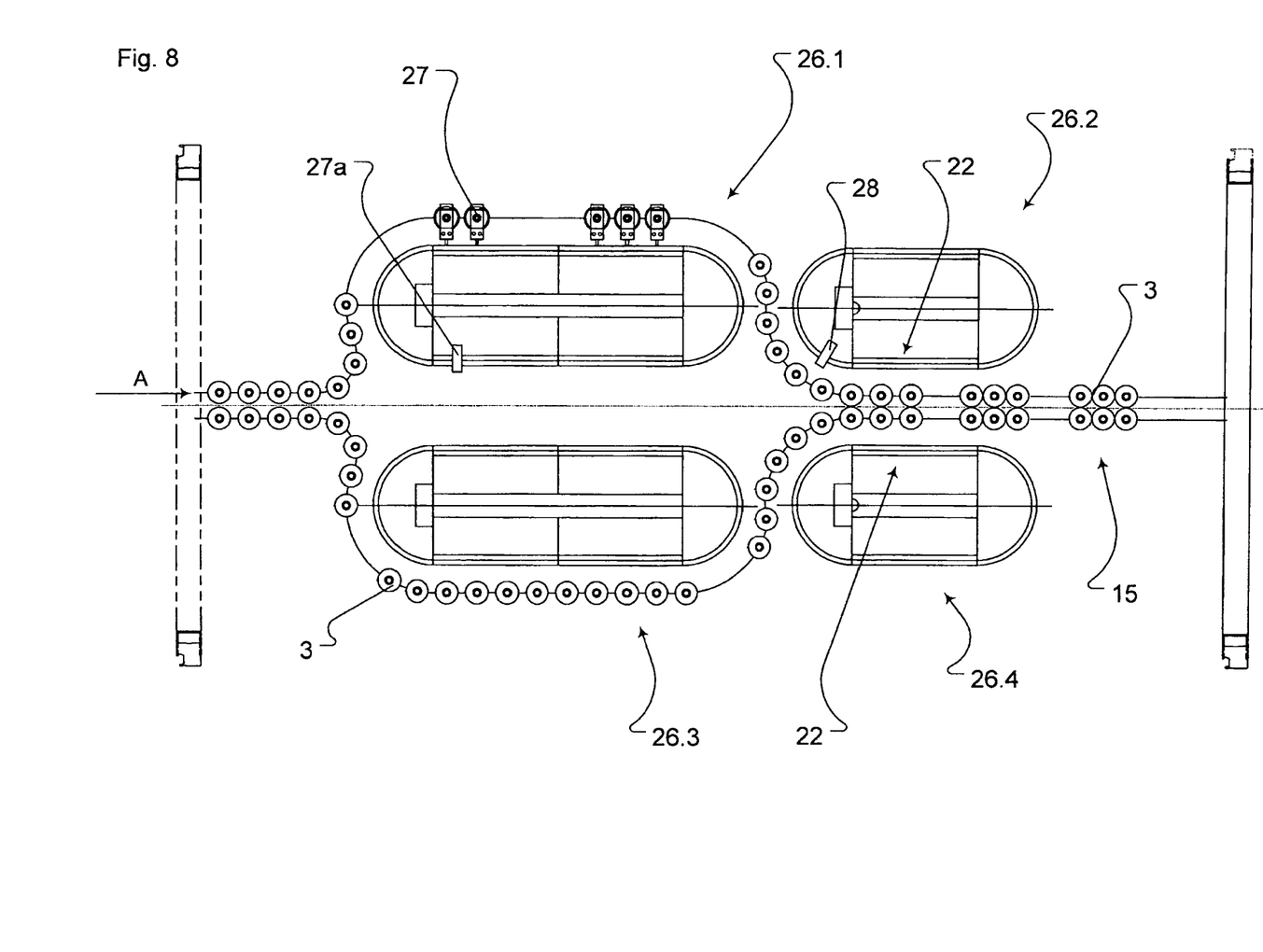
FIG. 8 shows a schematic representation of a device for producing bundles as an electromagnetic, linear endless transporter.
Figure 9:
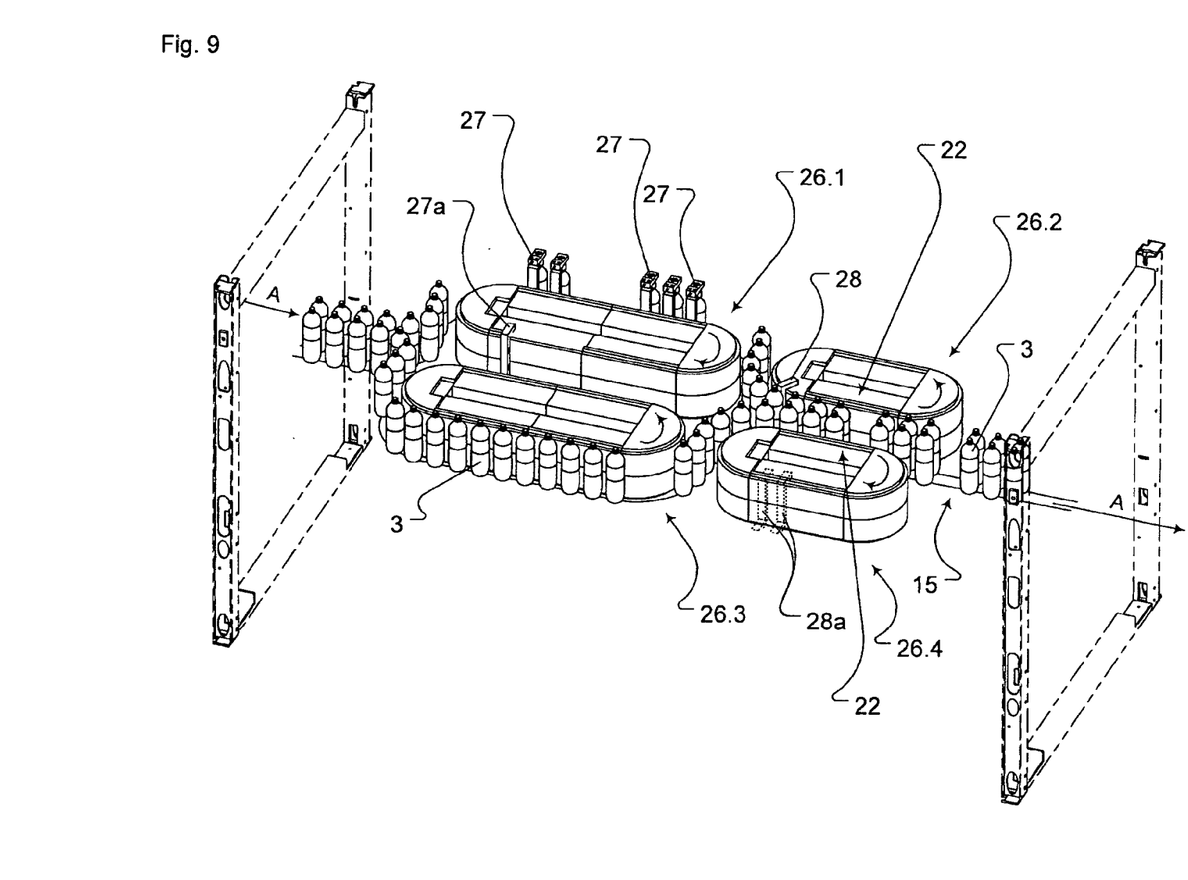
FIG. 9 shows this device in perspective view.

In an improved embodiment of the device, shown in FIGS. 8 and 9, the star transporters are replaced by endlessly circulating transport systems that are configured as linear drives provided with circulating and electrically drivable carriages. For each container 3, the container guides, for example the base guides 6 and/or the head guides 7, are disposed on such a carriage 27. The drives for the rotation of containers 3 about their respective vertical axes are also advantageously disposed on carriage 27.

It is to particular advantage that the linear drives 26 operate according to the principle of an electro-magnetic linear drive such that each transport carriage 27 can be driven, at least in sections in the circulation region of linear drive 26, independently of other carriages 26.

The fixed-position part of the linear drive 26 forms a guide for the movable transport carriages. A plurality of magnet poles with associated individually actuatable windings are provided, one following after the other in the movement direction or transport direction of the carriages, as well as permanent magnets which are provided on or in transport carriage 27. Such a linear drive is offered on the market under the brand name "PackTrak" by Siemens AG.

FIGS. 8 and 9 show such an arrangement comprising two electromagnetic linear drives 26.1, 26.2 for the upper container row in FIG. 8 and linear drives 26.3, 26.4 for the lower container row in FIG. 8. Analogously to the aforesaid examples, both container rows enter in two rows and are received by circulating linear drives 26.1, 26.3 or their carriages 27. An inlet or transfer element 29, which is also to be provided as required, is indicated as a circle. The container feeds can also be arranged in a transport direction A in such a way that they enter aligned with the straight line or at a tangent to the curve of the linear drive 26.

The figure shows certain carriages 27 carrying containers 3. The detection of the position and angle of rotation, aligning and handling of the containers 3 is carried out in the same manner as discussed in connection with FIGS. 1 to 7. Drives for the rotary motion of containers 3 as well as the handling stations and units described above are also not depicted or described, as an analogous configuration and positioning is to be selected.

The figure also shows returning carriages 27*a*, 28*a*. These carriages 27*a*, 27*b* are returning to collect a further container 3 or to act upon them.

The particularity of the solution shown here is that rear linear drives 26.2, 26.4 or their carriages 28, only three of which are shown schematically, can be effected such that containers 3 in the region of the inlet, i.e. the transition from an upstream linear drive 26.1 to its downstream linear drive 26.2, the containers are still held at a distance so as to avoid prematurely approaching one another and to prevent unwanted sticking. The desired container groups, which in this case each have six containers formed by two each of rows of three containers each, are formed in the region of the straight line that represents a partitioning and/or compressing section 22 by having containers 3 or partial groups of containers speed up or slow down relative to one another in a suitable manner.

For example, two adjacent containers can first be brought into contact at their adhesive points square to the transport direction, if necessary after previous scanning and alignment of the adhesive and sticking points, and these then bonded container sub-groups are speeded up or slowed down in a suitable manner so as to achieve the desired compressing and pressing together with container sub-groups that are adjacent in transport direction. The containers are ideally held so that they cannot rotate until an adequate curing and/or drying is assured.

The bundles or container groups so formed can ultimately be released onto a linear transporter 15.

In the depicted example of FIGS. 8 and 9, it is only in the region of the linear drive 26.1, 26.3 that the container is transported by the carriage 27 in a rotatable manner. After their transfer or conveyance into the engagement region of rear linear drives 26.2 and 26.4, containers 3 are ideally held in a way that prevents rotation because rotation of containers 3 about the vertical axis is now neither necessary nor desirable with the angular position of the adhesive and sticking points being known. Of advantage here is a supporting gripper guide for the containers 3 or a sliding transport onto a suitable base surface, ideally a metal substrate.

In an improved embodiment of the linear drive 26 or its transport carriage 28, the gripper and holder with which containers 3 are fixed can be displaced and driven square to main transport direction A. This improves the adhesion of adjacent containers 3 as any rotational motion is thus avoided.

The unit can also be composed in such a way that only the primary star according to the example in FIGS. 1 to 5 or only the outlet star is replaced in the aforesaid manner with a linear transporter, in particular an electromagnetically driven linear transporter with independently controllable and drivable carriages.

The invention claimed is:

1. An apparatus for producing bundles, said apparatus comprising at least one application element, container guides, a grouping unit, a multiple track container feed providing multiple container streams, and a container transporter for each container stream, wherein said container guides are selected from the group consisting of base guides and head guides, wherein said container guides are disposed on at least one container transporter, wherein said at least one application element is disposed in a region of at least one container transporter, wherein said at least one application element is configured to apply adhesive to containers, wherein said grouping unit is selected from the group consisting of a partitioning unit, a compressing unit, a partitioning section, and a compressing section, wherein said grouping unit is configured to group and compress a predetermined number of containers, wherein said grouping unit is disposed immediately downstream from a structure selected from the group consisting of at least one container transporter and an outlet device, and wherein said grouping unit is configured to combine said predetermined number of containers to form a bundle of containers downstream of said at least one container transporter for transportation onward, wherein said application elements are disposed one after another in a direction of conveyance of said at least one container transporter.

2. The apparatus of claim 1, wherein said container transporter comprises both base guides and head guides.

3. The apparatus of claim 2, wherein said base guides comprise turntables, and wherein said top guides comprise packing-and centering tulips.

4. The apparatus of claim 1, wherein said grouping unit comprises a linear transporter on which said containers are combined to form bundles and on which said bundles are transported onwards, wherein said linear transporter is arranged downstream of said container transporter.

5. The apparatus of claim 1, wherein said container transporter for each container stream comprises a star transporter for each container stream, wherein each star transporter comprises a primary star, wherein said container guides are disposed on said primary star, wherein said star transporter comprises a central axis, wherein said primary star rotates about said central axis, and wherein said at least one application element is disposed in a region of said star transporter.

6. The apparatus of claim 5, wherein said primary star comprises both base guides and head guides.

7. The apparatus of claim 5, wherein said application elements are disposed one after another in a direction of rotation of said primary star.

8. The apparatus of claim 5, wherein each star transporter further comprises an alignment star disposed upstream of said primary star.

9. The apparatus of claim 1, wherein said container transporter for each container stream comprises an electromagnetic linear drive with electrically-driven carriages, wherein said electrically-driven carriages are configured to be driven independently of one another, wherein said electrically-driven carriages comprise a first electrically-driven carriage and a second electrically-driven carriage, wherein said first electrically-driven carriage is configured to be driven at a first speed, wherein said second electrically-driven carriage is configured to be driven at a second speed, and wherein said first speed is greater than said second speed.

10. The apparatus of claim 9, further comprising an alignment unit disposed upstream of said container transporter, wherein said alignment unit comprises an electromagnetic linear drive, wherein said electromagnetic linear drive comprises electrically-driven carriages that are configured to be driven independently of one another and whose speed is configured to be independently controlled.

11. The apparatus of anyone of claim 9, wherein said electrically-driven carriages comprise container grippers.

12. The apparatus of claim 11, further comprising motorized drives, said motorized drives being configured to rotate containers gripped by said container grippers of said electrically-driven carriages.

13. The apparatus of claim 1, further comprising an alignment unit disposed upstream of at least one container transporter.

14. The apparatus of claim 13, wherein said alignment unit comprises an electromagnetic linear drive, wherein said electromagnetic linear drive comprises electrically-driven carriages that are configured to be driven independently of one another and whose speed is configured to be independently controlled.

15. An apparatus for producing bundles, said apparatus comprising at least one application element, container guides, a grouping unit, a multiple track container feed providing multiple container streams, and a container transporter for each container stream, wherein said container guides are selected from the group consisting of base guides and head guides, wherein said container guides are disposed on at least one container transporter, wherein said at least one application element is disposed in a region of at least one container transporter, wherein said at least one application element is configured to apply adhesive to containers, wherein said grouping unit is selected from the group consisting of a partitioning unit, a compressing unit, a partitioning section, and a compressing section, wherein said grouping unit is configured to group and compress a predetermined number of containers, wherein said grouping unit is disposed immediately downstream from a structure selected from the group consisting of at least one container transporter and an outlet device, and wherein said grouping unit is configured to combine said predetermined number of containers to form a bundle of containers downstream of said at least one container transporter for transportation onward, wherein at least two application elements are arranged one above the other.

16. The apparatus of claim 15, wherein said container transporter comprises both base guides and head guides.

17. The apparatus of claim 15, wherein said grouping unit comprises a linear transporter on which said containers are combined to form bundles and on which said bundles are transported onwards, wherein said linear transporter is arranged downstream of said at least one container transporter.

18. The apparatus of claim 15, wherein said container transporter for each container stream comprises a star transporter for each container stream, wherein each star transporter comprises a primary star, wherein said container guides are disposed on said primary star, wherein said star transporter comprises a central axis, wherein said primary star rotates about said central axis, and wherein said at least one application element is disposed in a region of said star transporter.

19. The apparatus of claim 15, wherein said container transporter for each container stream comprises an electromagnetic linear drive with electrically-driven carriages, wherein said electrically-driven carriages are configured to be driven independently of one another, wherein said electrically-driven carriages comprise a first electrically-driven carriage and a second electrically-driven carriage, wherein said first electrically-driven carriage is configured to be driven at a first speed, wherein said second electrically-driven carriage is configured to be driven at a second speed, and wherein said first speed is greater than said second speed.

20. The apparatus of claim 15, further comprising an alignment unit disposed upstream of said at least one container transporter.

* * * * *